(12) United States Patent
Otto (10) Patent No.: US 9,205,990 B2
(45) Date of Patent: Dec. 8, 2015

(54) CHAIN LINK OF A TRANSPORT CHAIN, TRANSPORT CHAIN OF A CONVEYOR AND CONVEYOR

(71) Applicant: Thomas Otto, Bielefeld (DE)

(72) Inventor: Thomas Otto, Bielefeld (DE)

( * ) Notice: Subject to any disclaimer, the term of this patent is extended or adjusted under 35 U.S.C. 154(b) by 0 days.

(21) Appl. No.: 14/149,376

(22) Filed: Jan. 7, 2014

(65) Prior Publication Data

US 2014/0190793 A1 Jul. 10, 2014

(30) Foreign Application Priority Data

Jan. 8, 2013 (DE) .......................... 10 2013 100 132

(51) Int. Cl.
*B65G 17/20* (2006.01)
*B65G 17/38* (2006.01)

(52) U.S. Cl.
CPC ................ *B65G 17/38* (2013.01); *B65G 17/20* (2013.01)

(58) Field of Classification Search
CPC ................................ B65G 17/38; B65G 17/20
USPC .......... 198/465.1, 465.2, 465.4, 678.1, 687.1; 104/172.1, 172.3, 172.4, 172.5
See application file for complete search history.

(56) References Cited

U.S. PATENT DOCUMENTS

| | | | | |
|---|---|---|---|---|
| 3,623,538 A * | 11/1971 | Wakabayashi et al. | .... | 104/172.4 |
| 4,242,965 A * | 1/1981 | Granet | .............. | 104/96 |
| 5,231,932 A * | 8/1993 | Enderlein et al. | ............. | 104/162 |
| 5,819,906 A * | 10/1998 | Enderlein et al. | ......... | 198/687.1 |
| 6,360,671 B1 * | 3/2002 | Nakagami | ..................... | 104/168 |
| 6,367,612 B1 * | 4/2002 | Dosso et al. | ............... | 198/465.4 |
| 6,382,396 B1 * | 5/2002 | Dana et al. | ................ | 198/465.4 |
| 2003/0150696 A1 | 8/2003 | Walter et al. | | |
| 2012/0193192 A1 | 8/2012 | Winkler | | |

FOREIGN PATENT DOCUMENTS

| | | |
|---|---|---|
| DE | 23 44 533 | 3/1975 |
| DE | 35 46 923 | 2/1996 |
| DE | 100 05 646 | 8/2001 |
| DE | 100 31 033 | 1/2002 |
| DE | 202 03 344 | 6/2002 |
| DE | 102005006455 | 8/2006 |
| DE | 202008007100 | 11/2009 |
| DE | 102010053426 | 6/2012 |

* cited by examiner

*Primary Examiner* — William R Harp
(74) *Attorney, Agent, or Firm* — Henry M. Feiereisen LLC (57) ABSTRACT

A chain link of a transport chain of a conveyor for conveying an article hanging from a holding adapter includes a base body having lateral contact surfaces configured to enable friction rollers to be pressed there against for driving the transport chain. Arranged on the base body at ends in spaced-apart relationship in a conveying direction are coupling sections for swingable connection with a neighboring chain link. Bearings are formed on an upper side of the base body for support of running or guide rollers. A thrust member is connected vertically elastically to an underside of the base body and has an underside provided with at least one recess for formfittingly receiving a coupler of a head piece of the holding adapter for holding the article to be conveyed.

17 Claims, 10 Drawing Sheets

CHAIN LINK OF A TRANSPORT CHAIN, TRANSPORT CHAIN OF A CONVEYOR AND CONVEYOR

CROSS-REFERENCES TO RELATED APPLICATIONS

This application claims the priority of German Patent Application, Serial No. 10 2013 100 132.7, filed Jan. 8, 2013, pursuant to 35 U.S.C. 119(a)-(d), the disclosure of which is incorporated herein by reference in its entirety as if fully set forth herein.

BACKGROUND OF THE INVENTION

The present invention relates in general to the field of transport of articles.

The following discussion of related art is provided to assist the reader in understanding the advantages of the invention, and is not to be construed as an admission that this related art is prior art to this invention.

US 2012/0193192 describes a drive chain of an overhead conveyor for transporting hanging articles. The drive chain has a plurality of traction rod elements connected by coupling elements. Each traction rod element has a base body extending substantially along a conveying direction and having a first longitudinal end and an opposite second longitudinal end, which respectively have a connection section into which a connection bolt is insertable. The base body has a frictional engagement section for interacting in a frictional-engaged manner with a drive wheel of a friction roller drive, which drive wheel is forced against the frictional engagement section to move the drive chain in the conveying direction. The base body further includes a positive engagement section for interacting with spaced synchronization units to prevent displacement of neighboring traction rod elements in the conveying direction by a positive engagement. Arranged at the underside of the base body are follower webs for taking along adapters from which the articles are hanging in the conveying direction.

The use of such drive chains is problematic in regions where adapters pile up.

It would therefore be desirable and advantageous to obviate other prior art shortcomings, in particular to enable a reliable transport of adapters and pile-up of adapters at predefined points of the conveyor.

SUMMARY OF THE INVENTION

According to one aspect of the present invention, a chain link of a transport chain of a conveyor for conveying an article hanging from a holding adapter includes a base body having lateral contact surfaces configured to enable friction rollers to be pressed there against for driving the transport chain, coupling sections which are arranged on the base body at ends in spaced-apart relationship in a conveying direction and which are configured for swingable connection with a neighboring chain link, bearings formed on an upper side of the base body and configured for support of running or guide rollers, and a thrust member connected vertically elastically to an underside of the base body and having an underside provided with at least one recess for formfittingly receiving a coupler of a head piece of the holding adapter for holding the article to be conveyed.

As a result of the elastic attachment of the thrust member to the base body of the chain link, the thrust member can be easily pushed upwards against the base body at the moment when holding adapters accumulate at a predefined spot of a conveyor, so that the chain link of the conveyor slides over the holding adapter to thereby allow to continue transport of further articles arranged on holding adapters on the chain link of the transport chain in a simple manner.

According to another advantageous feature of the present invention, the at least one recess of the thrust member has in the conveying direction a trailing edge which can be oriented transversely to the conveying direction and aligned at an obtuse angle in relation to the underside of the thrust member which underside is oriented in parallel relation to the conveying direction. Thus, when a holding adapter stops at a predefined position of the conveyor, the thrust member is pressed in the manner of a ramp upwards in the direction of the base body.

According to another advantageous feature of the present invention, a spring element may be provided to connect the thrust member with the base body. Advantageously the spring element is configured in the form of a spring leaf configured to extend at a slant for interconnecting the base body with the thrust member. Configuring the spring element as a spring leaf or elastic strip allows easy and cost-effective manufacture.

According to another advantageous feature of the present invention, the spring element can extend in relation to the base body and the thrust member at an angle between 5° and 30°. The presence of a substantially flat connection significantly facilitates elevation of the thrust members, when the holding adapters back up at a predefined position. As a result, the thus-forming back pressure applied by following adapters becomes very small so that wrinkling of, e.g., pieces of clothing guided by the adapters is avoided.

According to another advantageous feature of the present invention, the chain link can be made in one piece.

According to another aspect of the present invention, a transport chain of a conveyor for conveying an article hanging from a holding adapter includes a plurality of chain links swingably connected to one another, each chain link including a base body having lateral contact surfaces configured to enable friction rollers to be pressed there against for driving the transport chain, coupling sections which are arranged on the base body at ends in spaced-apart relationship in a conveying direction and which are configured for swingable connection with a neighboring chain link, bearings formed on an upper side of the base body and configured for support of running or guide rollers, and a thrust member connected vertically elastically to an underside of the base body and having an underside provided with at least one recess for formfittingly receiving a coupler of a head piece of the holding adapter for holding the article to be conveyed.

According to another advantageous feature of the present invention, the thrust member can have overlap portions on spaced-apart ends in the conveying direction for connection with a thrust member of an adjacent chain link. As a result, when a leading thrust member, as viewed in the conveying direction, is elevated by a backed-up holding adapter, the following thrust member is also slightly elevated so that the friction of the following thrust member on the backed up is reduced.

According to still another aspect of the present invention, a conveyor for conveying a hanging article includes a rail profile, a transport chain having a plurality of chain links and movable in the rail profile in a conveying direction, each chain link including a base body having lateral contact surfaces configured to enable friction rollers to be pressed there against for driving the transport chain, coupling sections arranged on the base body at ends in spaced-apart relationship in a conveying direction and configured for swingable connection with a neighboring chain link, and a thrust member formed an underside of the base body and having an underside provided with at least one recess, and a holding adapter configured to hold the article to be conveyed and having a head piece which is rollingly supported in the rail profile and configured for coupling with the thrust member.

According to another advantageous feature of the present invention, running rollers can be supported by the head piece of the holding adapter and configured to roll in the rail profile, with the head piece having a coupler configured to extend beyond the running rollers and received in the at least one recess by a formfit when engaged with the thrust member, with the formfit between the thrust member and the coupler of the holding adapter being configured to resiliently deflect the thrust member in a direction of the base body of the chain link when the coupler of the holding adapter exerts a predefined force impact upon the thrust member, wherein the formfit to the holding adapter is releasable. The provision of such a headpiece of the holding adapter enables a low-friction disengagement of the holding adapter from the thrust member of the chain link.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

For purposes of description herein, the terms "upper," "lower," "right," "left," "rear," "front," "vertical," "horizontal," and derivatives thereof shall relate to the invention as oriented in the illustration and position of chain link, chain, holding adapter and the like, as selected by way of example in the respective figures. However, it is to be understood that the invention may assume various alternative orientations and step sequences, except where expressly specified to the contrary. It is also to be understood that the specific devices and components illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
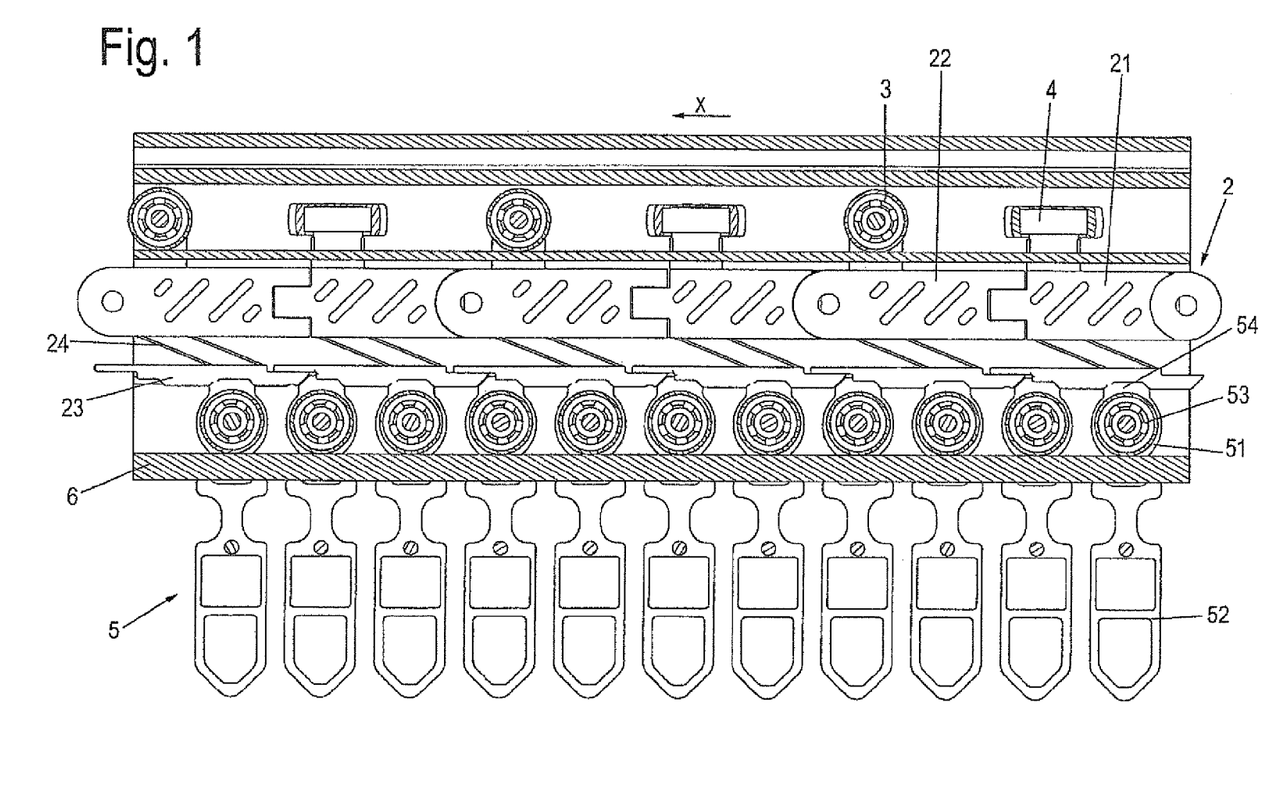
FIG. 1 is a schematic side sectional view of a portion of a transport chain and connected holding adapters of a conveyor, taken along a section line I-I in FIG. 2.
Figure 2:
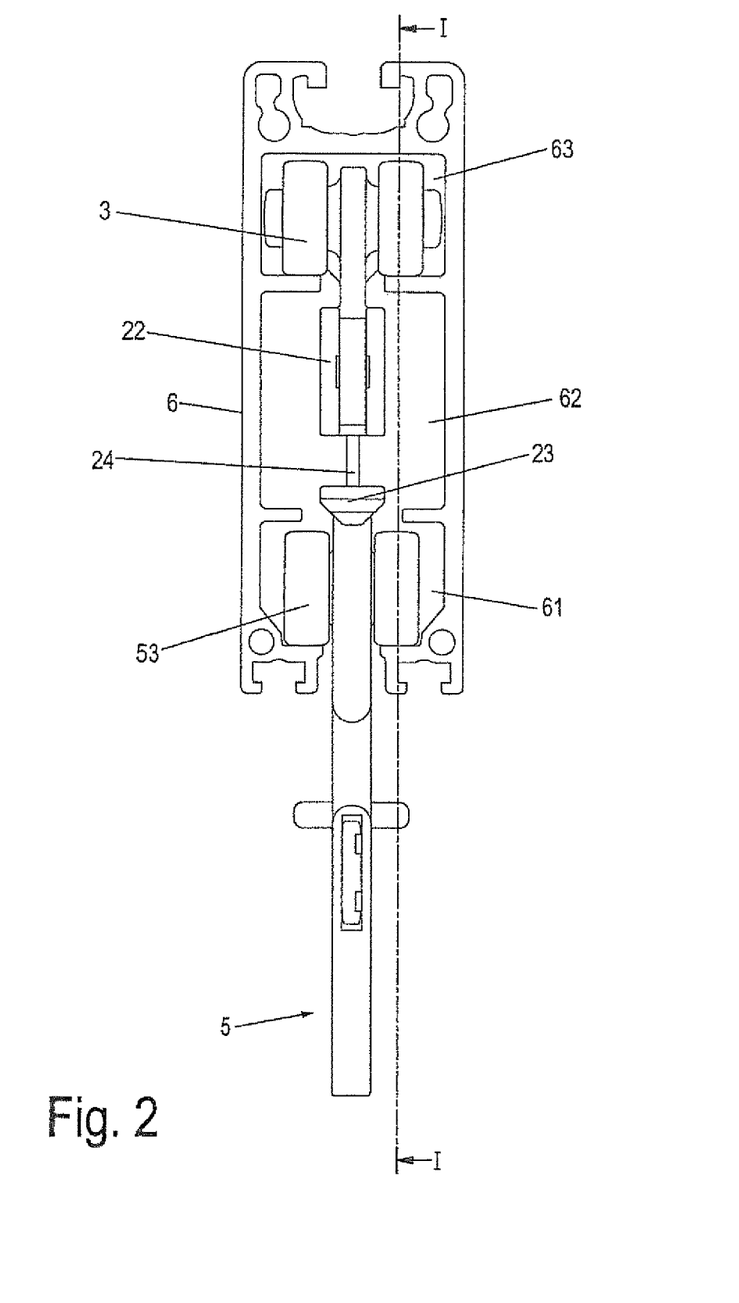
FIG. 2 is a sectional view of the conveyor of FIG. 1.

Turning now to the drawing, and in particular to FIG. 1, there is shown a schematic side sectional view of a portion of a transport chain, which is generally designated by reference numeral 2 and taken along a section line I-I in FIG. 2. The transport chain 2 forms part of a conveyor of which a portion only is shown and which includes a friction roller drive. The transport chain 2 includes a plurality of chain links 21, 22 which are hingedly connected with one another and are received in a rail profile 6 of the conveyor for movement in a conveying direction X for conveying articles, such as pieces of clothing for example, that hang on hangers for example. The hangers are each suspended in a holding adapter 5 which is conveyed in a conveying direction X by the transport chain 2.

The transport chain 2 is guided in the rail profile 6 by a running roller 3 or guide roller 4 which are arranged on each of the chain links 21, 22 and received in an upper cavity 63 of the rail profile 6. The running rollers 3 are supported on respective tracks of the rail profile 6 and movable in the rail profile 6 in the conveying direction X, as shown in particular in FIG. 2.

Figure 3:
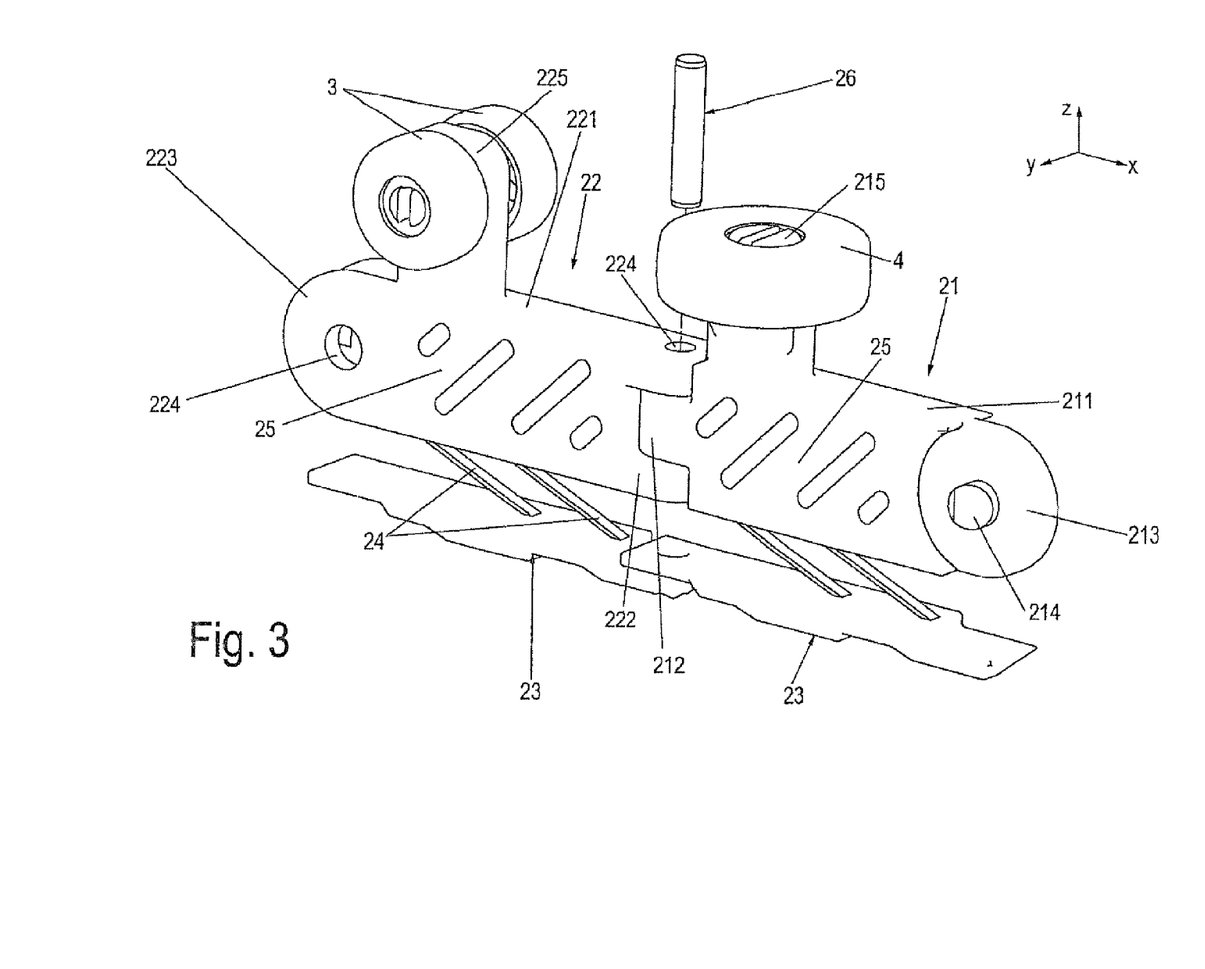
FIG. 3 is a perspective illustration of two interconnected embodiments of chain links according to the invention.

As shown in FIG. 3, which is a perspective illustration of two interconnected embodiments of chain links 21, 22, the chain link 21 has a base body 211 and a bearing 215 formed on an upper side of the base body 211 for support of running or guide rollers 3, 4. Likewise, the chain link 22 has a base body 221 and a bearing 225 formed on an upper side of the base body 221 for support of running or guide rollers 3, 4. Thrust members 23 are formed on an underside of the base bodies 211, 221. The base bodies 211, 221 and the thrust members 23 run in a central cavity 62 of the rail profile 6, whereas a head piece 51 of a holding adapter 5 is arranged in a lower cavity 61 of the rail profile 6. The head piece 51 of the holding adapter 5 is provided with track rollers 53 (FIG. 2) which roll along a track of the rail profile 6.

Figure 4:
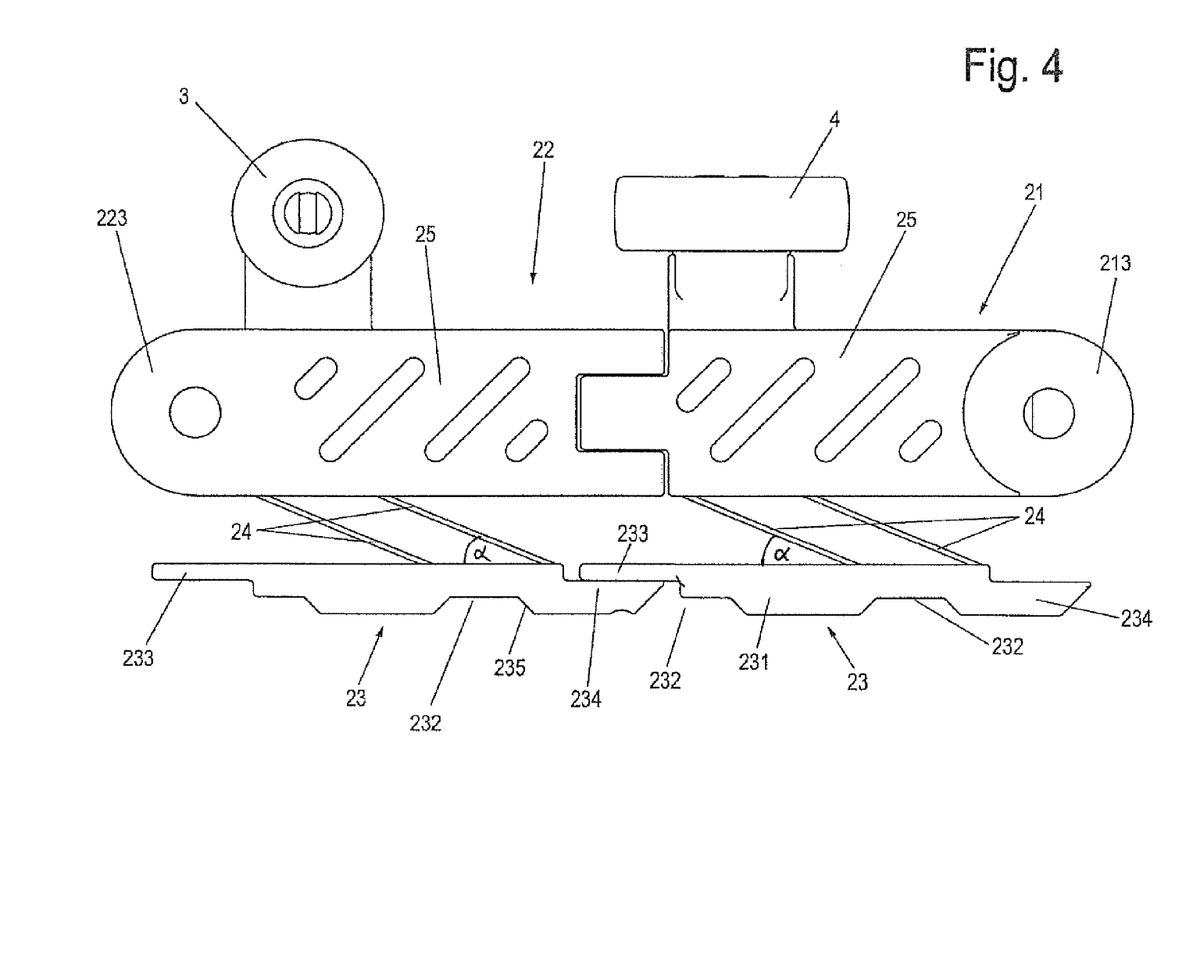
FIG. 4 is a side view of the chain links of FIG. 3.
Figure 5:
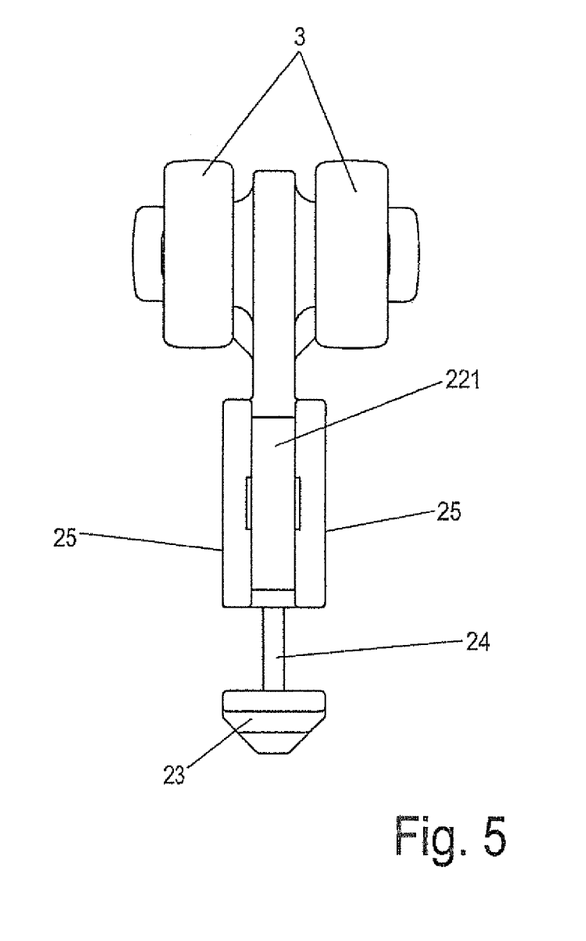
FIG. 5 is a bottom view of the chain links of FIG. 3.
Figure 6:
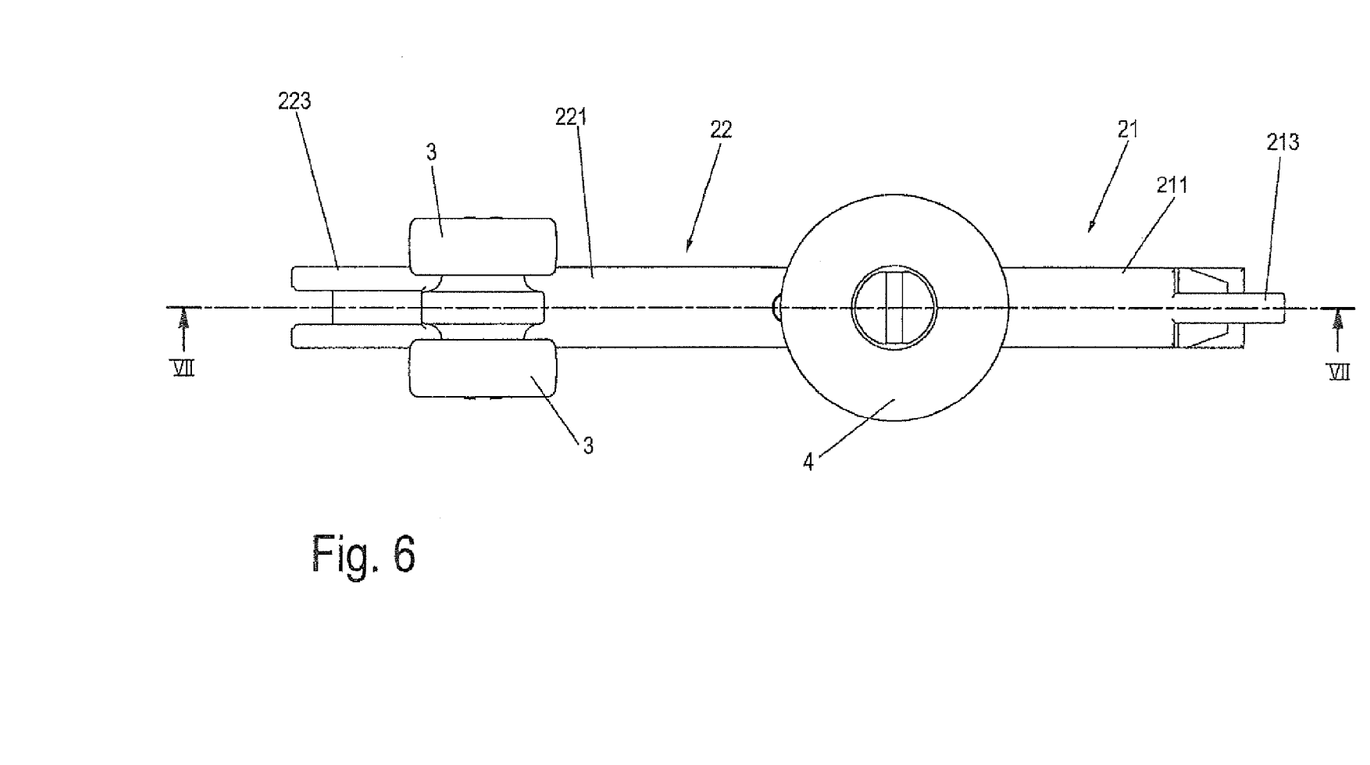
FIG. 6 is a top view of the chain links of FIG. 3.
Figure 7:
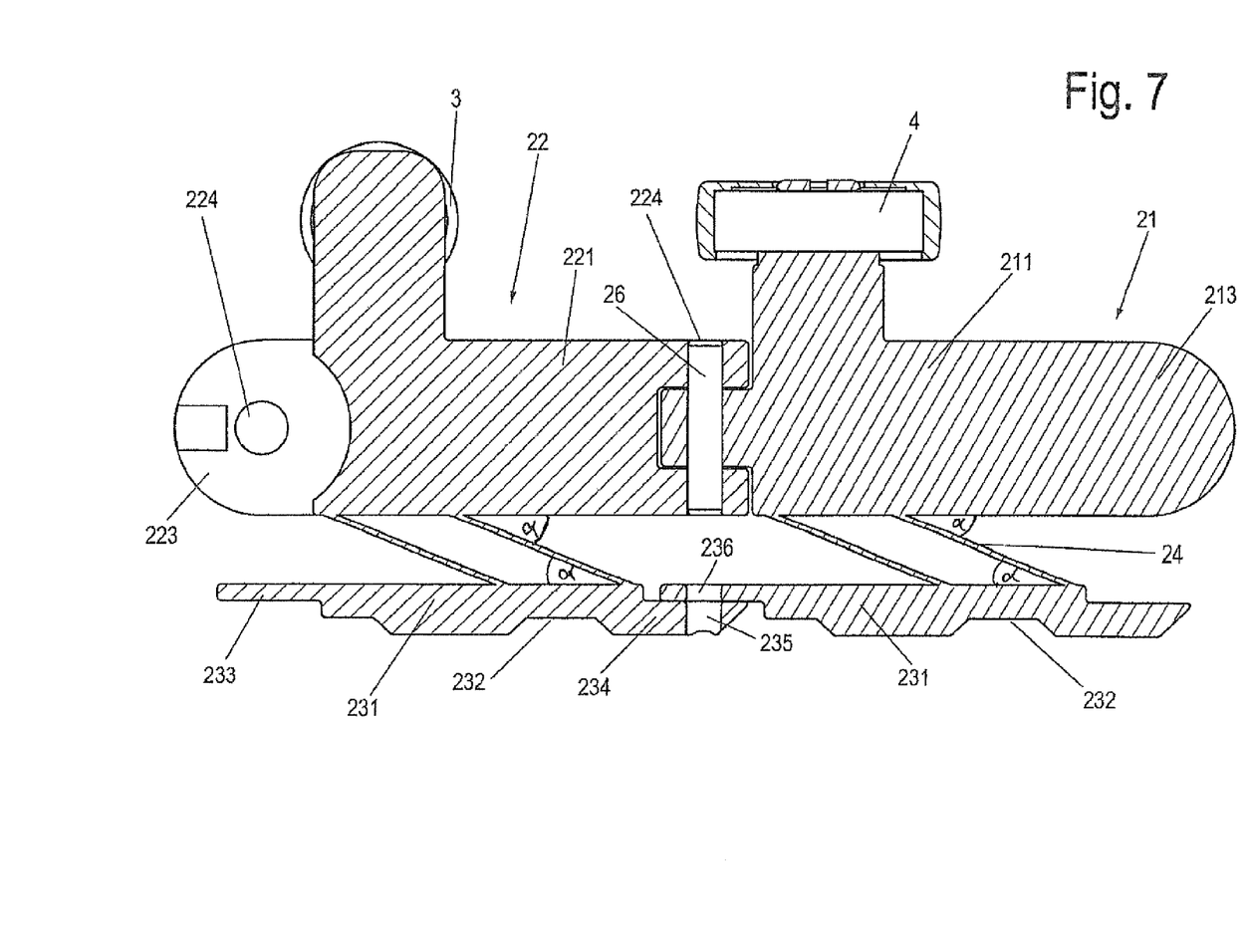
FIG. 7 a sectional view of the chain links of FIG. 3, taken along the section line VII-VII of FIG. 6.

A pair of chain links 21, 22 are shown in detail in FIGS. 3 to 7. FIGS. 3 and 4 clearly show the base bodies 211, 221 of the chain links 21, 22. The base bodies 211, 221 have side walls which are formed as friction roller contact surfaces 25 against which drive rollers (not shown) are pressed at one or more predefined positions of the conveyor to thereby cause the transport chain 2 to move.

The thrust members 23 are arranged beneath the base bodies 211, 221 on an underside of the base bodies 211, 221, with each thrust member 23 being connected vertically elastically with the base bodies 211, 221, respectively.

To convey the holding adapters 5, each thrust member 23 has an underside formed with a recess 232 for formfittingly receiving a coupler 54 of the head piece 51 of the holding adapter 5. These recesses 232 are advantageously configured each in relation to the underside, i.e. side facing the holding adapter 5, with a surface area which extends parallel thereto. The surface area defines hereby in the conveying direction X a trailing edge 235 which is oriented transversely to the conveying direction X at an obtuse angle to the underside of the thrust member 23, extending parallel to the conveying direction X.

Thus, when one or more holding adapters 5 pile up, the coupler 54 of the head piece 51 is able to slide out in a ramp-like manner from the recess 232 of the thrust member 23 to thereby separate the conveying connection between the holding adapter 5 and the respective chain link 21, 22 of the transport chain 2. During this separation, the thrust member 23 is pushed upwards by the depth of the recess 232 in the direction of the base bodies 211, 221 of the respective chain link 21, 22. This is enabled by the vertical elastic connection of the thrust member 23 with the base bodies 211, 221.

The elastic connection of the thrust members 23 with the base bodies 211, 221 is realized via several spring elements 24 which preferably are configured as spring leaves to connect the base bodies 211, 221 with the thrust members 23 at an oblique angle α in a range between 5° and 30°. Currently preferred is an angle α in a range between 5° and 15°. In view of the substantially flat connection, the thrust members 23 can be elevated in a much simpler manner, when the holding adapters 5 pile up at a predefined position. As a result, back pressure caused by following holding adapters 5 is fairly small so that wrinkling of pieces of clothing guided by the holding adapters 5 is avoided. Moreover, the flat attachment of the spring elements 24 with the base bodies 211, 221 and thrust members 23 allows a configuration of the spring elements 24 in the form of spring leaves with relatively thick walls so that stability of the chain links is additionally enhanced.

Each of the chain links 21, 22 can be made in one piece, for example as an injection-molded part. It is, of course, also conceivable to connect the base bodies 211, 221 with the thrust members 23 via the spring elements 24.

To further facilitate the holding adapters 5 from sliding out from the recesses 232 of the thrust members 23, the thrust members 23 arranged on the individual chain links 21, 22 are provided with overlap portions 233, 234 so that adjacent thrust members 23 of two chain links 21, 22 overlap each other with the overlap portions 233, 234, respectively.

The overlap portions 233, 234 to connect adjacent thrust members 23 are so configured that an overlap portion 234 of a leading one of the thrust members 23, as viewed in the conveying direction X, engages beneath an overlapping overlap portion 233 of a trailing thrust member 23 in the conveying direction X.

The individual chain links 21, 22 are pivotally connected to one another. Advantageously, a coupler 212 is formed on a first end of the base body 211 of one of the chain links 21 for swinging motion in a XY plane and provides with a respective coupler 222 of the neighboring chain link 22 and a pin 26 (FIG. 7) a swivel joint. The other end of the base body 211 of the first chain link 21 is advantageously realized as coupler 231 for swinging motion in a XZ plane which forms a further swivel joint with a respectively configured coupler 233 of the base body 221 of the second chain link 22 for rotation about a pivot axis 214 (FIG. 3).

To provide easy access to the pin 26, that provides the swingable connection of the chain links 21, 22 in the XY plane, during assembly or in the event of repair, overlapping bores 235, 236 can be provided in the overlap portions 233, 234 so that the pin 26 is reachable from underneath.

Figure 8:
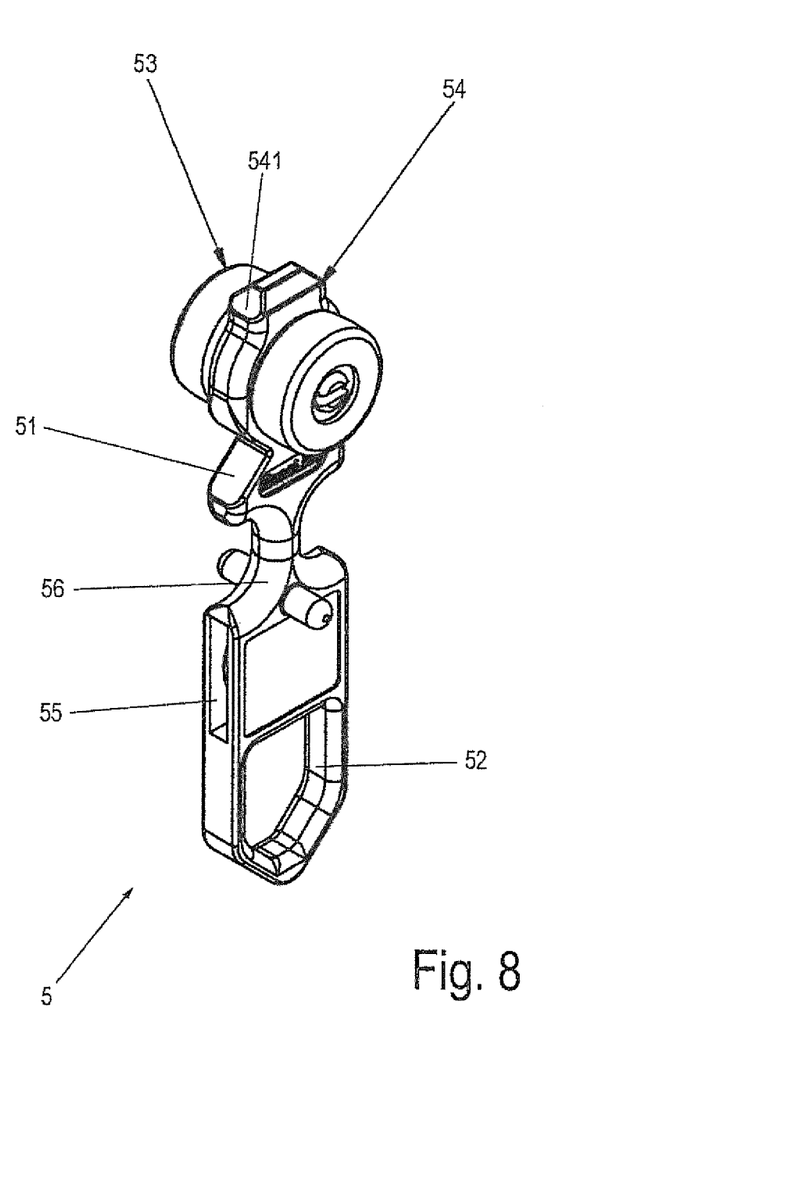
FIG. 8 is a top and side perspective view of a holding adapter.
Figure 9:
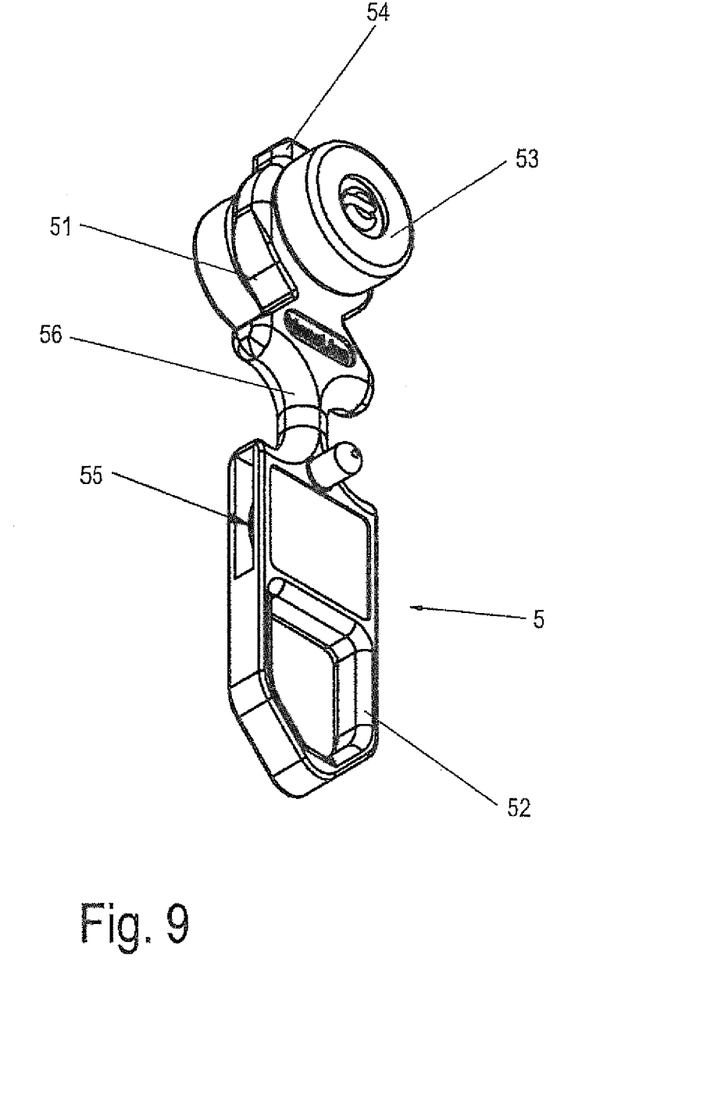
FIG. 9 is a bottom and side perspective view of the holding adapter.
Figure 10:
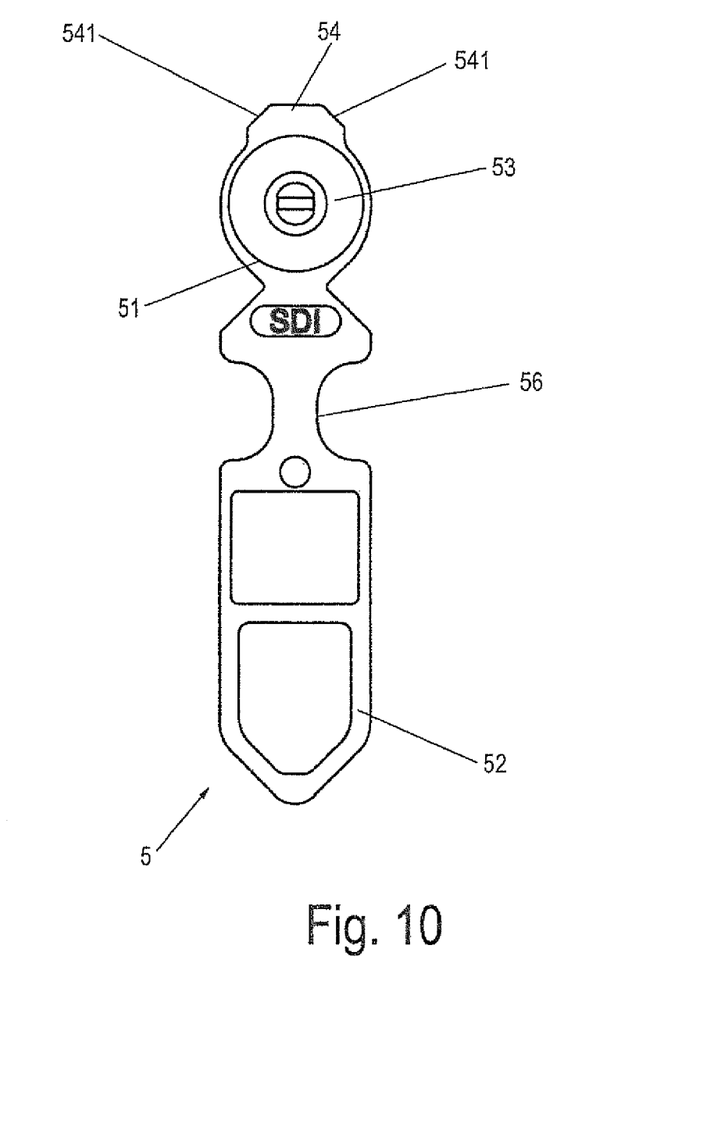
FIG. 10 a side view of the holding adapter of FIGS. 8 and 9.

FIGS. 8 to 10 show various views of an embodiment of a holding adapter 5. As shown in particular in FIG. 8, the holding adapter 5 essentially includes a head piece 51 on which track rollers 53 are mounted and received in a lower receiving zone 63 of the rail profile 6, and a receiving frame 52 in which a wire hanger can be suspended for example. The receiving frame 52 is connected to the head piece 51 via a tapering neck 56 and a receiving zone 55 which is arranged below the neck 56 for placement of an identification piece, e.g. a RFID-chip.

The head piece 51 extends beyond the track rollers 53 upwards and form a coupler 54 which projects beyond the track rollers 53 and is formfittingly received in one of the recesses 232 of the thrust member 23 when engaged with the thrust member 23. The formfitting connection between the trust member 23 and the coupler 54 of the holding adapter 5 is configured such that the thrust member 23 moves in the direction of the base body 211, 221 of the respective chain link 21, 22 of the transport chain 2, when the coupler 54 of the holding adapter 5 applies a predefined force upon the thrust member 23, so that the connection to the holding adapter 5 is releasable. The end faces 541 of the coupler 54, which extend transversely to the conveying direction X, are slanted such that the coupler 54 is received formfittingly in the recess 232 of the thrust member 23 and is pressed via the slanted end faces 541 upwards, when the holding adapter 5 stops to thereby liberate the holding adapter 5.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A chain link of a transport chain of a conveyor for conveying an article hanging from a holding adapter, said chain link comprising:
 a base body having lateral contact surfaces configured to enable friction rollers to be pressed there against for driving the transport chain;
 coupling sections arranged on the base body at ends in spaced-apart relationship in a conveying direction and configured for swingable connection with a neighboring chain link;
 bearings formed on an upper side of the base body and configured for support of running or guide rollers;
 a thrust member connected vertically elastically to an underside of the base body and having an underside provided with at least one recess for formfittingly receiving a coupler of a head piece of the holding adapter for holding the article to be conveyed; and
 a spring element configured to connect the thrust member with the base body, wherein the spring element is configured in the form of a spring leaf configured to extend at a slant for interconnecting the base body with the thrust member.

2. The chain link of claim 1, wherein the at least one recess of the thrust member has in the conveying direction a trailing edge which is oriented transversely to the conveying direction and aligned at an obtuse angle in relation to the underside of the thrust member which underside is oriented in parallel relation to the conveying direction.

3. The chain link of claim 1, wherein the spring element extends in relation to the base body and the thrust member at an angle between 5° and 30°.

4. The chain link of claim 1, constructed in one piece.

5. A transport chain of a conveyor for conveying an article hanging from a holding adapter, said transport chain comprising a plurality of chain links swingably connected to one another, each said chain link including a base body having lateral contact surfaces configured to enable friction rollers to be pressed there against for driving the transport chain, coupling sections arranged on the base body at ends in spaced-apart relationship in a conveying direction and configured for swingable connection with a neighboring chain link, bearings formed on an upper side of the base body and configured for support of running or guide rollers, a thrust member connected vertically elastically to an underside of the base body and having an underside provided with at least one recess for formfittinqly receiving a coupler of a head piece of the holding adapter for holding the article to be conveyed, and a spring element configured to connect the thrust member with the base body, wherein the spring element is configured in the form of a spring leaf configured to extend at a slant for interconnecting the base body with the thrust member.

6. The transport chain of claim 5, wherein the at least one recess of the thrust member has in the conveying direction a trailing edge which is oriented transversely to the conveying direction and aligned at an obtuse angle in relation to the underside of the thrust member which underside is oriented in parallel relation to the conveying direction.

7. The transport chain of claim 5, wherein the spring element extends in relation to the base body and the thrust member at an angle between 5° and 30°.

8. The transport chain of claim 5, wherein the chain link is made in one piece.

9. The transport chain of claim 5, wherein the thrust member has overlap portions on spaced-apart ends in the conveying direction for connection with a thrust member of an adjacent chain link.

10. A conveyor of for conveying a hanging article, comprising:
   a rail profile;
   a transport chain having a plurality of chain links and movable in the rail profile in a conveying direction, each said chain link including a base body having lateral contact surfaces configured to enable friction rollers to be pressed there against for driving the transport chain, coupling sections arranged on the base body at ends in spaced-apart relationship in a conveying direction and configured for swingable connection with a neighboring chain link, and a thrust member formed an underside of the base body and having an underside provided with at least one recess;
   a holding adapter configured to hold the article to be conveyed and having a head piece which is rollingly supported in the rail profile and configured for coupling with the thrust member; and
   a spring element configured to connect the thrust member with the base body, wherein the spring element is configured in the form of a spring leaf configured to extend at a slant for interconnecting the base body with the thrust member.

11. The conveyor of claim 10, wherein the at least one recess of the thrust member has in the conveying direction a trailing edge which is oriented transversely to the conveying direction and aligned at an obtuse angle in relation to the underside of the thrust member which underside is oriented in parallel relation to the conveying direction.

12. The conveyor of claim 10, wherein the spring element extends in relation to the base body and the thrust member at an angle between 5° and 30°.

13. The conveyor of claim 10, wherein the chain link is made in one piece.

14. The conveyor of claim 10, wherein the thrust member has overlap portions on spaced-apart ends in the conveying direction for connection with a thrust member of an adjacent chain link.

15. The conveyor of claim 14, wherein the overlap portions of the thrust member define a leading overlap portion and a trailing overlap portion, said leading overlap portion of the thrust member engaging underneath a trailing overlap portion of the thrust member of the adjacent chain link.

16. The conveyor of claim 10, further comprising running rollers supported by the head piece of the holding adapter and configured to roll in the rail profile, said head piece having a coupler configured to extend beyond the running rollers and received in the at least one recess by a formfit when engaged with the thrust member, said formfit between the thrust member and the coupler of the holding adapter being configured to resiliently deflect the thrust member in a direction of the base body of the chain link when the coupler of the holding adapter exerts a predefined force impact upon the thrust member, wherein the formfit to the holding adapter is releasable.

17. The conveyor of claim 10, wherein the holding adapter has a mount for an identification piece.

* * * * *